(No Model.)
JOHANN & JACOB STUBER.
REFRIGERATING APPARATUS FOR HOUSES.
No. 324,278. Patented Aug. 11, 1885.
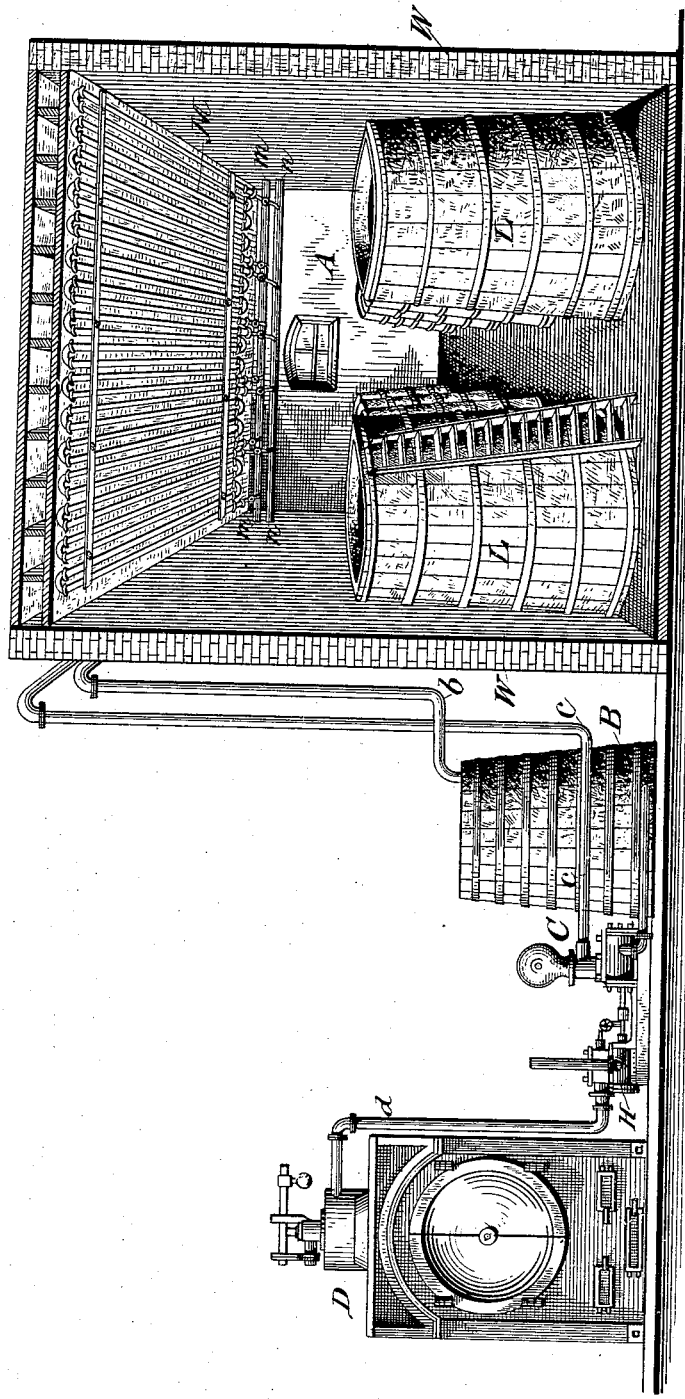
WITNESSES
INVENTOR
Johann Stuber, and
Jacob Stuber.
By their Attorney

UNITED STATES PATENT OFFICE.

JOHANN STUBER AND JACOB STUBER, OF SYRACUSE, NEW YORK.

REFRIGERATING APPARATUS FOR HOUSES.

SPECIFICATION forming part of Letters Patent No. 324,278, dated August 11, 1885.

Application filed June 17, 1885. (No model.)

*To all whom it may concern:*

Be it known that we, JOHANN STUBER and JACOB STUBER, of Syracuse, in the county of Onondaga and State of New York, have invented certain new and useful Improvements in Refrigerating Apparatus for Houses; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to apparatus and a freezing or refrigerating mixture used in connection therewith for cooling to the desired low temperature cellars and other rooms of buildings in which malt liquor is to be fermented or stored for preservation, or in which solid foods may also be stored for preservation.

The object of the invention is to provide a simple and economical means for producing and maintaining the desired low temperature in the fermenting and storing rooms.

The refrigerating-mixture which we employ is composed of ingredients in about the following proportions: chloride of sodium, or common salt, two hundred pounds; chloride of ammonium, or sal-ammoniac, twenty-five pounds; and chloride of calcium, twenty-five pounds, together with broken ice and a sufficient quantity of water to circulate the whole through the coils of pipe in the room to be cooled.

The matter constituting our invention will be defined in the claims.

The apparatus used in forcing and circulating our refrigerating-fluid and forming part of our invention is represented in the accompanying drawing, which illustrates the different parts partially in elevation and partially in perspective.

The cellar or room A is shown with its walls W in section and with the refrigerating-coils M secured to its ceiling, while the fermenting tubs or vats L are ranged on its floor. The sections of coils are connected with the inlet-pipe $m$ and with outlet-pipe $n$. The tank B contains the refrigerating-solution to be circulated in the coils. The steam force-pump C, operated by engine H, connects by induction-pipe $a$ with the bottom of the tank, and by eduction-pipe $c$ with inlet-pipe $m$ of the coils, and the return-pipe $b$ leads from outlet-pipe $n$ of the coils to the top of tank B. Steam-supply pipe $d$ connects the dome of the boiler with the steam-engine H. The tank B might be placed in the cellar to be cooled, while the pump, engine, and boiler should be placed in a separate room, all in convenient position for economical operation.

In operating the apparatus for cooling an apartment the tank B is charged with the refrigerating-mixture of chloride of sodium, chloride of ammonium, chloride of calcium, broken ice, and a sufficient quantity of water, after which it may be closed. The pump is then started and the cold liquid forced through the coils of the pipe with a pressure of about fifty-five pounds to the square inch, and returned to the tank to be again forced into the coils, and is thus circulated continuously or intermittently to the extent required for maintaining the low temperature required. At suitable intervals, as required, additional quantities of the refrigerating compound and ice are charged into the tank, in order to keep the fluid sufficiently cool, and the surplus warm fluid is periodically drawn off. The air in the top of the apartment, becoming cool by the refrigerating-coils, naturally falls, and a circulation is thus set up, whereby all parts of the apartment are uniformly cooled.

We have learned by practical operation that our refrigerating compound or mixture of salts above mentioned is superior for producing a low temperature. By the circulation of the refrigerating-fluid the coils in a short time become coated with ice several inches thick, and we can thus very readily cool a cellar down and keep it at the desired temperature.

Having described our invention, what we claim, and desire to secure by Letters Patent, is—

1. In combination with a cellar or room to be cooled, a coil of pipe located therein, a tank containing a refrigerating-mixture composed of chloride of sodium, chloride of ammonium, chloride of calcium, and ice and water, a force-pump, and suitable connecting-pipes, whereby the cold fluid containing all these ingredients may be circulated through the coils and back to the tank.

2. The method of producing refrigeration in buildings, consisting of forcing a freezing-mixture containing ice through a system of pipes in said building, substantially as set forth.

3. In combination with a refrigerating apparatus, a tank containing a refrigerating-fluid charged with a freezing-mixture composed of chloride of sodium, chloride of ammonium, and chloride of calcium, with ice, in suitable proportions, for the purpose described.

In testimony that we claim the foregoing as our own we affix our signatures in presence of two witnesses.

JOHANN STUBER.
JACOB STUBER.

Witnesses:
H. D. ROSE,
E. S. DAWSON.